United States Patent
Reinhart et al.

(10) Patent No.: US 7,390,179 B2
(45) Date of Patent: Jun. 24, 2008

(54) SCROLL MACHINE HAVING COUNTERWEIGHTS WITH CHANGEABLE CAVITY

(75) Inventors: Keith J Reinhart, Sidney, OH (US); James A Schaefer, Troy, OH (US); Eric P Cavender, Troy, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 492 days.

(21) Appl. No.: 11/020,004

(22) Filed: Dec. 21, 2004

(65) Prior Publication Data
US 2006/0133945 A1 Jun. 22, 2006

(51) Int. Cl.
*F01C 1/02* (2006.01)
*F01C 1/063* (2006.01)

(52) U.S. Cl. ..................... 418/55.3; 418/55.1

(58) Field of Classification Search ........ 418/55.1–55.5
See application file for complete search history.

(56) References Cited

U.S. PATENT DOCUMENTS

| 4,893,044 | A | | 1/1990 | Bush et al. |
| 5,386,163 | A | | 1/1995 | Heilman |
| 5,437,543 | A | * | 8/1995 | Goto et al. ................. 418/55.5 |
| 5,495,885 | A | | 3/1996 | Fowlkes et al. |
| 6,291,920 | B1 | | 9/2001 | Miller et al. |
| 6,305,914 | B1 | | 10/2001 | Lifson |
| 2006/0133944 | A1 | * | 6/2006 | Doepker et al. ............ 418/55.1 |

FOREIGN PATENT DOCUMENTS

| EP | 0 317 056 A1 | 5/1989 |
| EP | 0 407 265 A1 | 2/1992 |
| EP | 0 911 527 A1 | 4/1999 |
| JP | 60-070953 | 4/1985 |

\* cited by examiner

*Primary Examiner*—Hoang M Nguyen
(74) *Attorney, Agent, or Firm*—Harness, Dickey & Pierce, P.L.C.

(57) ABSTRACT

A balancing system for different compressors utilizes a counterweight having a common exterior configuration. The mass of the counterweight is optimized for each compressor by changing the size of a recess located in the counterweight. In one embodiment, the recess is an arcuately shaped recess; and in another embodiment, the recess is a plurality of holes.

21 Claims, 4 Drawing Sheets

SCROLL MACHINE HAVING COUNTERWEIGHTS WITH CHANGEABLE CAVITY

FIELD OF THE INVENTION

The present invention relates to the balancing of rotary machines. More particularly, the present invention relates to counterweights which are used to balance rotary machines where the counterweight includes a variable sized cavity which is used to optimize the mass of the counterweight.

BACKGROUND AND SUMMARY OF THE INVENTION

A class of machines exists in the art generally known as "scroll" apparatus for the displacement of various types of fluids. Such apparatus may be configured as an expander, a displacement engine, a pump, a compressor, etc., and many features of the present invention are applicable to any one of these machines. For purposes of illustration, however, the disclosed embodiments are in the form of a hermetic refrigerant compressor.

Generally speaking, a scroll apparatus comprises two spiral scroll wraps of similar configuration, each mounted on a separate end plate to define a scroll member. The two scroll members are interfitted together with one of the scroll wraps being rotationally displaced 180 from the other. The apparatus operates by orbiting one scroll member (the "orbiting scroll") with respect to the other scroll member (the "fixed scroll" or "non-orbiting scroll") to make moving line contacts between the flanks of the respective wraps, defining moving isolated crescent-shaped pockets of fluid. The spirals are commonly formed as involutes of a circle, and ideally there is no relative rotation between the scroll members during operation; i.e., the motion is purely curvilinear translation (i.e., no rotation of any line in the body). The fluid pockets carry the fluid to be handled from a first zone in the scroll apparatus where a fluid inlet is provided, to a second zone in the apparatus where a fluid outlet is provided. The volume of a sealed pocket changes as it moves from the first zone to the second zone. At any one instant in time, there will be at least one pair of sealed pockets; and when there are several pairs of sealed pockets at one, each pair will have different volumes. In a compressor, the second zone is at a higher pressure than the first zone and is physically located centrally in the apparatus, the first zone being located at the outer periphery of the apparatus.

Two types of contacts define the fluid pockets formed between the scroll members: axially extending tangential line contacts between the spiral faces or flanks of the wraps caused by radial forces ("flank sealing"), and area contacts caused by axial forces between the plane edge surfaces (the "tips") of each wrap and the opposite end plate ("tip sealing"). For high efficiency, good sealing must be achieved for both types of contacts.

The concept of a scroll-type apparatus has, thus, been known for some time and has been recognized as having distinct advantages. For example, scroll machines have high isentropic and volumetric efficiency, and, hence, are relatively small and lightweight for a given capacity. They are quieter and more vibration-free than many compressors because they do not use large reciprocating parts (e.g., pistons, connecting rods, etc.), and because all fluid flow is in one direction with simultaneous compression in plural opposed pockets, there are less pressure-created vibrations. Such machines also tend to have high reliability and durability because of the relatively few moving parts utilized, the relatively low velocity of movement between the scrolls, and an inherent forgiveness to fluid contamination.

The orbiting of the one scroll member with respect to the other scroll member creates an imbalance which is typically counteracted using one or more counterweights. When designing new compressors and/or redesigning and modifying existing compressors, it is sometimes necessary to design a new counterweight. The need for a new counterweight is typically required when the mass of the counterweight needs to be optimized for a specific application. Each time a new counterweight of a new mass is required, new molds for the counterweight of the specific mass must be developed. The development of the new molds incurs development time and capital costs associated with the new mold.

The present invention provides the art with a counterweight which includes a recess. The size and/or depth of the recess can be varied to vary the mass of the counterweight. Thus, a counterweight having common outer dimensions can be manufactured in various masses by changing the size and/or depth of the recess in the counterweight to meet the required mass for the counterweight. The fact that counterweights having different masses can still maintain common outer dimensions eliminates the need for the tooling on the assembly line which assemble the counterweights to the compressor assembly to be modified and/or changed when different masses of counterweights are used.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The balancing system of the present invention is applicable to any type of rotary apparatus. For exemplary purposes only, the present invention is described in conjunction with a rotary compressor and, in particular, with a scroll-type refrigerant compressor.

Figure 1:
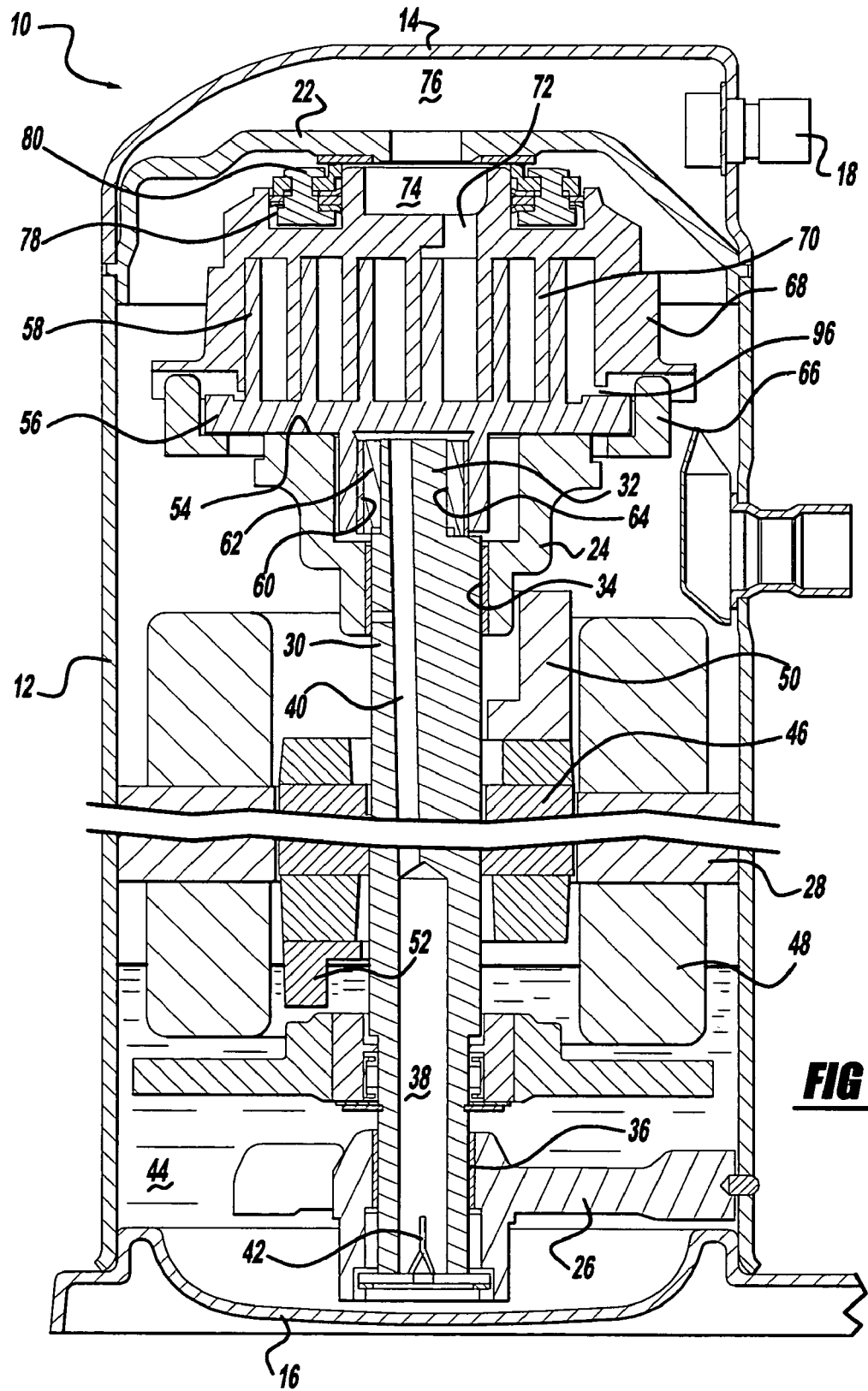
FIG. 1 is a vertical cross-sectional view through the center of a scroll-type refrigeration compressor incorporating the variable mass counterweights in accordance with the present invention.

Referring now to the drawings in which like reference numerals designate like or corresponding parts throughout the several views, there is shown in FIG. 1 a scroll compressor which incorporates the balancing system in accordance with the present invention which is designated generally by reference numeral 10. Compressor 10 comprises a generally cylindrical hermetic shell 12 having welded at the upper end thereof a cap 14 and at the lower end thereof a base 16 having a plurality of mounting feet (not shown) integrally formed therewith. Cap 14 is provided with a refrigerant discharge fitting 18 which may have the usual discharge valve therein (not shown). Other major elements affixed to the shell include a transversely extending partition 22, which is welded about its periphery at the same point that cap 14 is welded to shell 12 a main bearing housing 24 which is suitably secured to shell 12 and a lower bearing housing 26 also having a plurality of radially outwardly extending legs, each of which is also suitably secured to shell 12. A motor stator 28, which is generally square in cross-section but with the corners rounded off, is press fitted into shell 12. The flats between the rounded corners on the stator provide passageways between the stator and shell, which facilitate the return flow of lubricant from the top of the shell to the bottom.

A drive shaft or crankshaft 30 having an eccentric crank pin 32 at the upper end thereof is rotatably journaled in a bearing 34 in main bearing housing 24, and a second bearing 36 in lower bearing housing 26. Crankshaft 30 has at the lower end a relatively large diameter concentric bore 38 which communicates with a radially outwardly included smaller diameter bore 40 extending upwardly therefrom to the top crankshaft 30. Disposed within bore 38 is a stirrer 42. The lower portion of the interior shell 12 defines an oil sump 44 which is filled with lubricating oil to a level slightly above the lower end of a rotor 46; and bore 38 acts as a pump to pump lubricating fluid up the crankshaft 30 and into bore 40, and ultimately to all of the various portions of the compressor which require lubrication.

Crankshaft 30 is rotatively driven by an electric motor including stator 28, windings 48 passing therethrough and rotor 46 press fitted on the crankshaft 30 and having upper and lower counterweights 50 and 52, respectively.

The upper surface of main bearing housing 24 is provided with a flat thrust bearing surface 54 on which is disposed an orbiting scroll member 56 having the usual spiral vane or wrap 58 on the upper surface thereof. Projecting downwardly from the lower surface of orbiting scroll member 56 is a cylindrical hub having a journal bearing 60 therein, and in which is rotatively disposed a drive bushing 62 having an inner bore 64 in which crank pin 32 is drivingly disposed. Crank pin 32 has a flat on one surface which drivingly engages a flat surface (not shown) formed in a portion of bore 64 to provide a radially compliant driving arrangement, such as shown in U.S. Pat. No. 4,877,382, the disclosure of which is hereby incorporated herein by reference. An Oldham coupling 66 is also provided, positioned between orbiting scroll member 56 and main bearing housing 24, and keyed to orbiting scroll member 56 and a non-orbiting scroll member 68 to prevent rotational movement of orbiting scroll member 56. Oldham coupling 66 is preferably of the type disclosed in U.S. Pat. No. 5,320,506, the disclosure of which is hereby incorporated herein by reference.

Non-orbiting scroll member 68 is also provided, having a wrap 70 positioned in meshing engagement with wrap 58 of orbiting scroll member 56. Non-orbiting scroll member 68 has a centrally disposed discharge passage 72 which communicates with an upwardly open recess 74 which, in turn, is in fluid communication with a discharge muffler chamber 76 defined by cap 14 and partition 22. An annular recess 78 is also formed in non-orbiting scroll member 68 within which is disposed a seal assembly 80. Recesses 74 and 78 and seal assembly 80 cooperate to define axial pressure biasing chambers which receive pressurized fluid being compressed by wraps 58 and 70 so as to exert an axial biasing force on non-orbiting scroll member 68 to thereby urge the tips of respective wraps 58, 70 into sealing engagement with the opposed end plate surfaces. Seal assembly 80 is preferably of the type described in greater detail in U.S. Pat. No. 5,156,539, the disclosure of which is hereby incorporated herein by reference. Non-orbiting scroll member 68 is designed to be mounted to main bearing housing 24 in a suitable manner such as disclosed in the aforementioned U.S. Pat. No. 4,877,382 or U.S. Pat. No. 5,102,316, the disclosure of which is hereby incorporated herein by reference.

Figure 2:
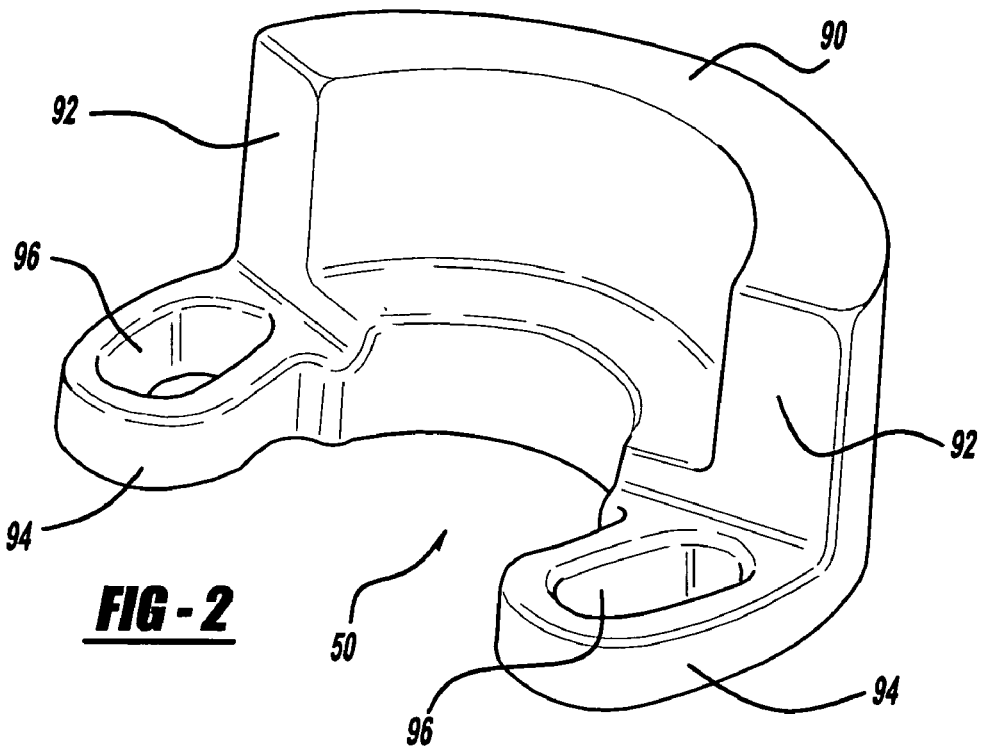
FIG. 2 is a perspective view looking down on the counterweight illustrated in FIG. 1 and the mold or die used to manufacture the counterweight.
Figure 3:
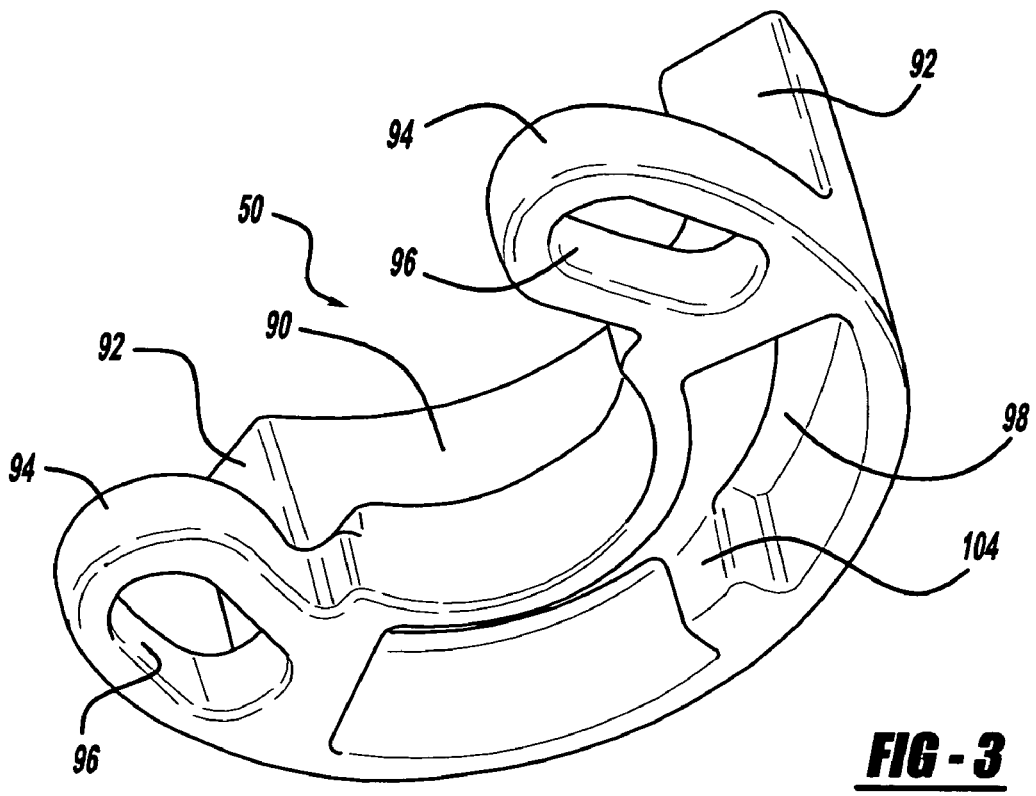
FIG. 3 is a perspective view looking up on the counterweight and mold or die illustrated in FIG. 2.

Referring now to FIGS. 2 and 3, upper counterweight 50 is illustrated in greater detail. While the present invention is being described in relation to upper counterweight 50, it is within the scope of the present invention to incorporate the variable mass characteristics of upper counterweight 50 into lower counterweight 52, if desired.

Upper counterweight 50 is stepped and it comprises a semi-circular C-shaped section or main body 90 having circumferentially opposite end faces 92 and a pair of opposite circumferentially extended flange positions 94, each including an opening 96 which is utilized to secure counterweight 50 to rotor 46. C-shaped section 90 has an arcuate body portion between end faces 92 which extends circumferentially through an arc of up to, but not exceeding, 180° so as to be disposed entirely on one side of a plane extending along the axis of rotation of rotor 46. Flange portions 94 extend circumferentially from the juncture of end faces 92 to define an angular extension exceeding 180°.

Figure 4:
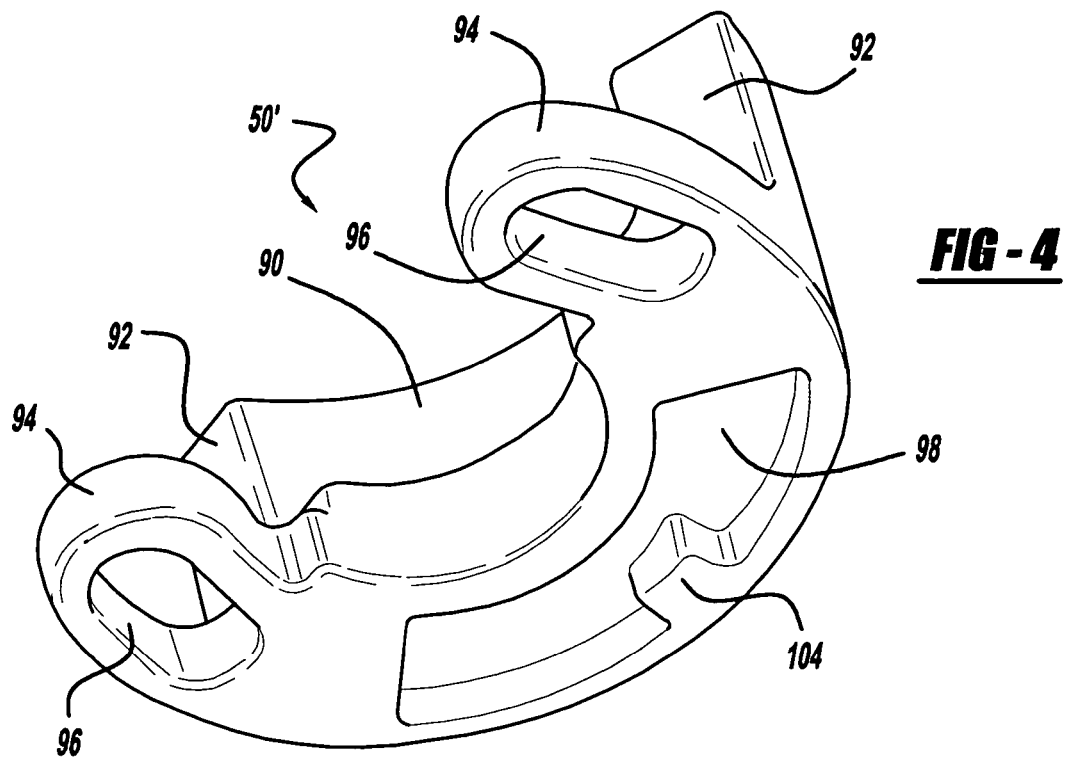
FIG. 4 is a view similar to FIG. 3, but showing the counterweight having a different mass.
Figure 6:
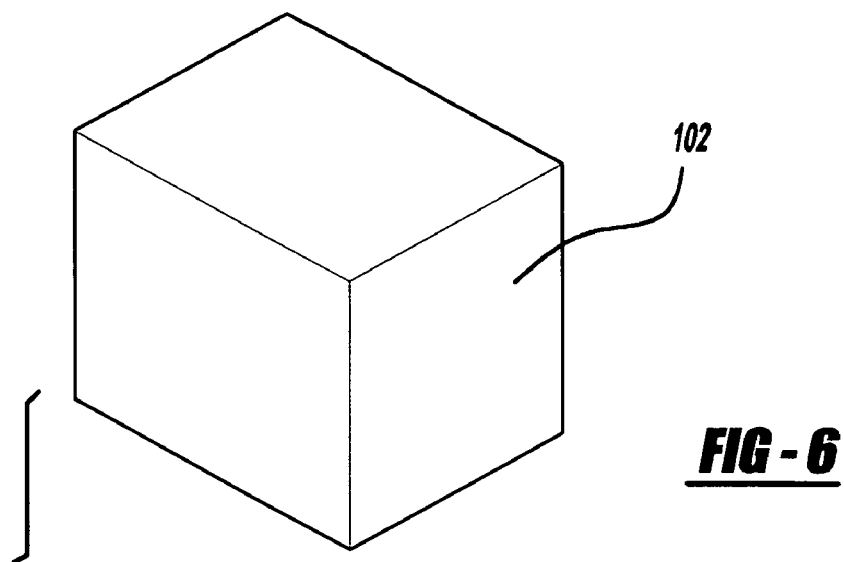
FIG. 6 is a perspective view of a mold assembly which produces the counterweight illustrated in FIGS. 2 and 3.

C-shaped section 90 defines a cavity or recess 98 which is utilized to achieve a specified mass for counterweight 50. Recess 98 extends over a specified arc and it has a specified depth. Both the length of the arc and the depth of the recess can be varied by having different interchangeable cores 100 (FIG. 6), which are inserted into a mold or die 102 (FIG. 6), which is utilized to manufacture counterweight 50. In addition, one or more ribs 104 can be formed to extend into recess 98 to adjust the mass of counterweight 50 to the specified mass. Counterweight 50' illustrated in FIG. 4 has an increased mass when compared to the mass of counterweight 50 due to the shorter arc of recess 98, the shorter depth of recess 98 and the addition of one or more ribs 104. This is accomplished by having a different core or pin 100. The exterior configuration of counterweights 50 and 50' are identical, thus allowing both counterweights 50 and 50' to be manufactured in the same mold or die 102 (FIG. 6) with different cores 100 being utilized to define the different sizes of recess 98. Counterweight 50' would replace counterweight 50 when the operating characteristics of compressor 10 change, with the change in operating characteristics requiring rebalancing of compressor 10.

Figure 5:
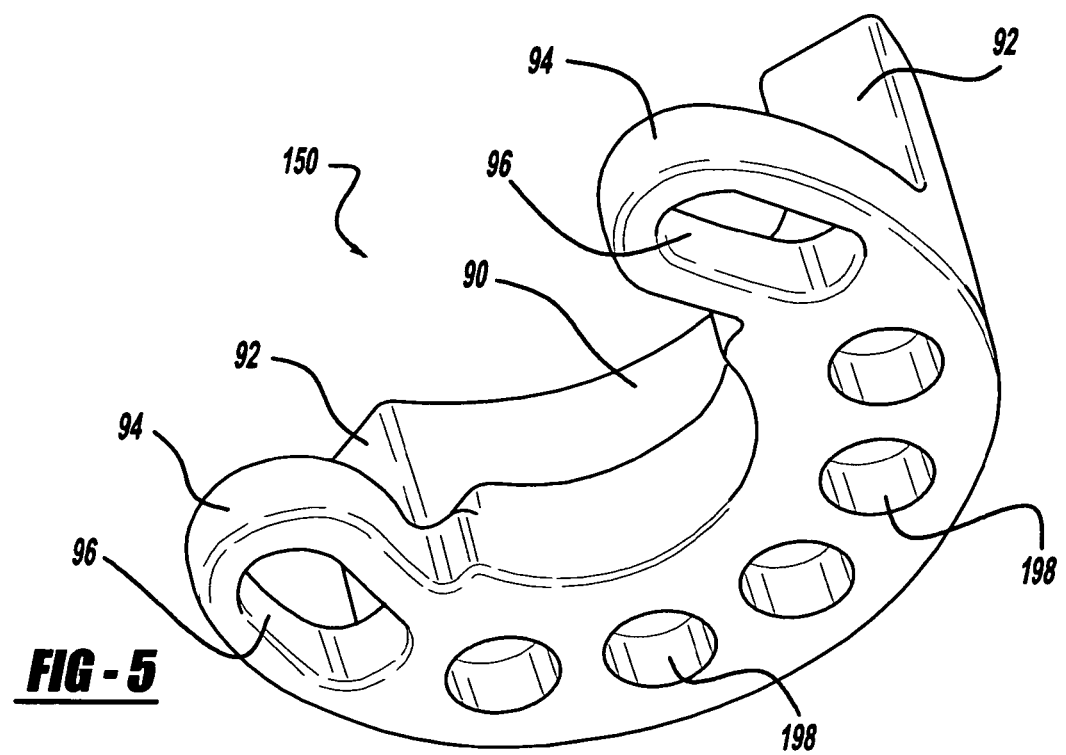
FIG. 5 is a perspective view looking up on a counterweight and forming mold or die in accordance with another embodiment of the present invention.
Figure 7:
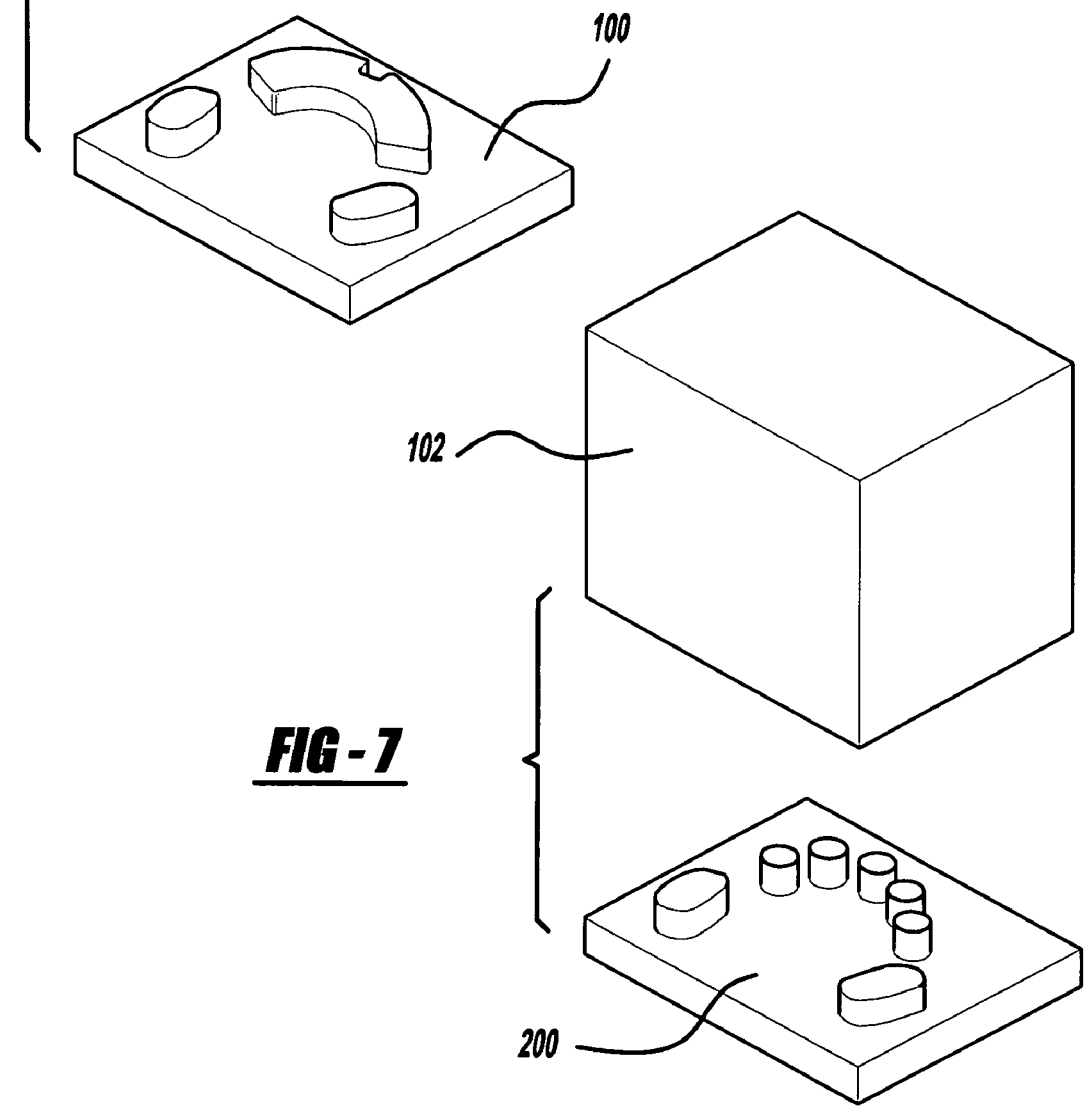
FIG. 7 is a perspective view of a mold assembly which produces the counterweight illustrated in FIG. 5.

Referring now to FIG. 5, a counterweight 150 is illustrated in accordance with another embodiment of the present invention. Counterweight 150 is the same as counterweight 50, except that recess 98 has been replaced with a plurality of holes 198. The plurality of holes 198 are circumferentially spaced along C-shaped section 90 and each of them has a specified depth. Both the number of holes 198 and the depth of each hole 198 can be independently varied by having a core 200 (FIG. 7) having different numbers and lengths of pins 200, which are inserted into the mold or die 102 (FIG. 7), which is utilized to manufacture counterweights 150.

Thus, counterweights having common outer dimensions can be manufactured in different masses. This feature reduces the costs associated with additional plant capital. Prior art designs of counterweights vary by height and/or diameter thus requiring the assembly tooling for the counterweight to be modified or replaced when different masses of counterweights are used. By communizing the outer dimensions for a plurality of counterweight masses, a single set of assembly equipment can be utilized for all of the plurality of counterweight masses.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A balancing system for a scroll machine comprising:
   a shell;
   a first scroll member disposed within said shell, said first scroll member having a first end plate and a first spiral wrap projecting outwardly from said first end cap;
   a second scroll member disposed within said shell, said second scroll member having a second end plate and a second spiral wrap projecting outwardly from said second end cap, said second scroll wrap being intermeshed with said first scroll wrap;
   a drive member for causing said scroll members to orbit relative to one another whereby said spiral wraps will create pockets of progressively changing volume between a suction pressure zone and a discharge pressure zone; and
   a counterweight associated with said drive member, said counterweight having a main body defining a recess, said recess being selected to optimize the total mass of said counterweight, a pair of flanges extending from opposite sides of said main body, each of said flanges defining a hole for attaching said counterweight to said drive member.

2. The balancing system for a scroll machine according to claim 1, wherein said recess comprises a plurality of holes.

3. The balancing system for a scroll machine according to claim 1, wherein said drive member includes a motor having a stator and a rotor, said counterweight being attached to said rotor.

4. The balancing system for a scroll machine according to claim 1, wherein said main body is an arcuate body.

5. A balancing system for a scroll machine comprising:
   a first shell;
   a first scroll member disposed within said first shell, said first scroll member having a first end plate and a first spiral wrap extending from said first end plate;
   a second scroll member disposed within said first shell, said second scroll member having a second end plate and a second spiral wrap extending from said second end plate;
   a first drive member for causing said first and second scroll members to orbit relative to one another whereby said first and second spiral wraps will create pockets of progressively changing volume between a first suction pressure zone and first discharge zone;
   a first counterweight associated with first drive member, said first counterweight having a first main body defining a first recess;
   a second shell;
   a third scroll member disposed within said second shell, said third scroll member having a third end plate and a third spiral wrap extending from said third end plate;
   a fourth scroll member disposed within said second shell, said fourth scroll member having a fourth end plate and a fourth spiral wrap extending from said fourth end plate;
   a second drive member for causing said third and fourth scroll members to orbit relative to one another whereby said third and fourth spiral wraps will create pockets of progressively changing volume between a second suction pressure zone and a second discharge zone;
   a second counterweight associated with second drive member, said second counterweight having a second main body defining a second recess; and
   said first and second main bodies of said first and second counterweights having common outer dimensions, said first and second recesses defined by said first and second main bodies being different in size to optimize said first counterweight for said first and second scroll members and to optimize said second counterweight for said third and fourth counterweights.

6. The balancing system for a scroll machine according to claim 5, wherein said first recess comprises a plurality of holes.

7. The balancing system for a scroll machine according to claim 6, wherein said second recess comprises a plurality of holes.

8. The balancing system for a scroll machine according to claim 5, wherein said first drive member includes a first motor having a first stator and a first rotor, said first counterweight being attached to said first rotor.

9. The balancing system for a scroll machine according to claim 8, wherein said second drive member includes a second motor having a second stator and a second rotor, said second counterweight being attached to said second rotor.

10. The balancing system for a scroll machine according to claim 5, wherein said first main body is a first arcuate body.

11. The balancing system for a scroll machine according to claim 10, wherein said second main body is a second arcuate body.

12. The balancing system for a scroll machine according to claim 5, wherein said first counterweight includes a first pair of flanges extending from opposite sides of said first main body, each of said first flanges defining a hole for attaching said first counterweight to said first drive member.

13. The balancing system for a scroll machine according to claim 12, wherein said second counterweight includes a second pair of flanges extending from opposite sides of said second main body, each of said second flanges defining a hole for attaching said second counterweight to said second drive member.

14. The balancing system for a scroll machine according to claim 5, wherein said first and second scroll members have operating characteristics that are different than operating characteristics of said third and fourth scroll members.

15. A method of balancing a scroll machine comprising:
    providing a first scroll member;
    providing a second scroll member;
    providing a first drive member for causing said first and second scroll members to orbit relative to one another;
    providing a first counterweight having a main body and a pair of flanges extending from opposite sides of said main body, each of said flanges defining a hole for attaching said counterweight to said first drive member;
    optimizing the mass of said first counterweight by selecting a first specified size of a first recess; and
    forming said first recess within said first counterweight.

16. The method according to claim 15, wherein selecting the specified size of the first recess includes selecting a specified number and a specified depth for a plurality of holes.

17. The method according to claim 15, wherein selecting the specified size of the first recess includes selecting a length and a depth for the first recess.

18. The method according to claim 15 further comprising:
    providing a third scroll member;
    providing a fourth scroll member;
    providing a second drive member for causing said third and fourth scroll members to orbit relative to one another;

providing a second counterweight having a main body and a pair of flanges extending from opposite sides of said main body, each of said flanges defining a hole for attaching said counterweight to said second drive member;

optimizing the mass of said second counterweight by selecting a second specified size of a second recess, the mass of said second counterweight being different than the mass of said first counterweight; and forming said second recess within said second counterweight.

19. The balancing system for a scroll machine according to claim 9, wherein:

selecting the specified size of the first recess includes selecting a specified number and a specified depth for a first plurality of holes; and selecting the specified size of the second recess includes selecting a specified number and a specified depth for a second plurality of holes.

20. The method according to claim 18, wherein:

selecting the specified size of the first recess includes selecting a length and a depth for the first recess; and selecting the specified size of the second recess includes selecting a length and a depth for the second recess.

21. The method according to claim 18 further comprising providing first operating characteristics for said first and second scroll members and providing second operating characteristics for said third and fourth scroll members, said second operating characteristics being different than said first operating characteristics.

* * * * *

UNITED STATES PATENT AND TRADEMARK OFFICE
CERTIFICATE OF CORRECTION

PATENT NO. : 7,390,179 B2  Page 1 of 1
APPLICATION NO. : 11/020004
DATED : June 24, 2008
INVENTOR(S) : Keith J. Reinhart, James A. Schaefer and Eric P. Cavender It is certified that error appears in the above-identified patent and that said Letters Patent is hereby corrected as shown below:

Column 1, line 27, "180" should be -- 180° --.

Column 5, line 51, after "discharge" insert -- pressure --.

Column 5, line 67, after "discharge" insert -- pressure --.

Signed and Sealed this

Twenty-third Day of December, 2008

JON W. DUDAS
*Director of the United States Patent and Trademark Office*